(12) United States Patent
Sadaoka et al.

(10) Patent No.: US 8,727,677 B2
(45) Date of Patent: May 20, 2014

(54) BORING APPARATUS AND BORING METHOD

(75) Inventors: Hideki Sadaoka, Tochigi (JP); Takashi Seto, Kanagawa (JP)

(73) Assignees: Honda Motor Co., Tokyo (JP); Makino J Co., Ltd., Aiko-Gun (JP)

( * ) Notice: Subject to any disclaimer, the term of this patent is extended or adjusted under 35 U.S.C. 154(b) by 768 days.

(21) Appl. No.: 12/988,226

(22) PCT Filed: Apr. 17, 2009

(86) PCT No.: PCT/JP2009/057794
§ 371 (c)(1),
(2), (4) Date: Oct. 15, 2010

(87) PCT Pub. No.: WO2009/128544
PCT Pub. Date: Oct. 22, 2009

(65) Prior Publication Data
US 2011/0027028 A1 Feb. 3, 2011

(30) Foreign Application Priority Data
Apr. 17, 2008 (JP) ................. 2008-107637

(51) Int. Cl.
*B23B 51/06* (2006.01)
(52) U.S. Cl.
USPC ........................... 408/1 R; 408/57
(58) Field of Classification Search
USPC .......... 408/1 R, 54, 56, 57, 59, 708; 384/100, 384/114
See application file for complete search history.

(56) References Cited

U.S. PATENT DOCUMENTS

| | | | | |
|---|---|---|---|---|
| 3,382,739 A | * | 5/1968 | Jacobson | 408/143 |
| 3,496,806 A | | 2/1970 | Porath | |
| 3,540,319 A | * | 11/1970 | Greenberg | 408/79 |
| 3,570,191 A | * | 3/1971 | Williams | 451/294 |
| 4,206,953 A | | 6/1980 | Diehl et al. | |
| 4,693,642 A | * | 9/1987 | Mair et al. | 408/59 |
| 5,540,526 A | | 7/1996 | Hyatt et al. | |

FOREIGN PATENT DOCUMENTS

| | | |
|---|---|---|
| JP | 2001-179514 | 7/2001 |
| JP | 2002-502710 | 1/2002 |
| JP | 2004-141982 | 5/2004 |

* cited by examiner

*Primary Examiner* — Daniel Howell
*Assistant Examiner* — Chwen-Wei Su
(74) *Attorney, Agent, or Firm* — Rankin, Hill & Clark LLP

(57) ABSTRACT

A boring device includes a base on which a work is placed, a cutting tool inserted into the through hole of the work, a rotatingly driving device for rotating the cutting tool, and supporting jigs for supporting the cutting tool by bush surfaces. The cutting tool includes a tool body having a main flow path and second branch flow paths and cutting edges formed on the outer peripheral surface of the tool body. Recessed pockets are formed in the outer peripheral surface of the cutting tool at the respective portions opposed to the bush surfaces of the support jigs. A set screw is detachably fitted to each of the second branch flow paths. The set screw includes an orifice allowing the upstream side and the downstream side of each of the second branch flow paths to communicate with each other.

1 Claim, 3 Drawing Sheets

BORING APPARATUS AND BORING METHOD

TECHNICAL FIELD

The present invention relates to a boring apparatus and a boring method. More particularly, the present invention relates to a boring apparatus and a boring method for boring a workpiece having a through-hole.

BACKGROUND ART

In a process of manufacturing an automobile, a shaft through-hole through which a crankshaft is inserted is cut out in a cylinder block of an engine. Subsequently, a cylinder head and a crank case and the like are assembled to the cylinder block.

The shaft through-hole is formed in the following procedure.

First, a cutting tool having a cylindrical tool body and a plurality of cutting blades on an outer circumferential surface of the tool body is prepared. The cutting tool includes a main flow path, which extends in a longitudinal direction, and a first branch flow path which diverges from the main flow path and reaches a vicinity of each cutting blade provided on the outer circumferential surface.

Then, a plurality of through-holes serving as pilot holes spaced from one another are formed in the cylinder block. Subsequently, the cutting tool having the cutting blades is inserted in the pilot holes. In this state, the cutting tools are rotationally driven to simultaneously cut inner circumferential surfaces of the plurality of pilot holes, that is, to perform what is called "line boring". Consequently, shaft through-holes are concentrically formed on the pilot holes.

At that time, heat and chips are generated at a machined part of the inner circumferential surface of the through-holes by the cutting blades. The heat and the chips are eliminated by spraying machining liquid from a vicinity of each cutting blade.

In such line boring, the cutting tool is rotationally driven by holding one end thereof in a cantilever state. Thus, there have been problems in that the cutting tool is downwardly curved under its own weight, that the machining precision of the shaft through-hole is degraded, and that the cutting tool vibrates.

Accordingly, a technique for supporting the other end of the cutting tool by a support jig has been proposed (see Parent Document 1).

In the apparatus disclosed in Patent Document 1, a second branch flow path formed so as to reach a part of the outer circumferential surface from the main flow path, which faces a bushing face of a support jig, is provided in the cutting tool. Then, machining liquid is sprayed onto the bushing face of the support jig through the second branch flow path. Thus, a hydrodynamic bearing is formed between the bushing face of a support jig and the outer circumference surface of the cutting tool.

However, according to the apparatus disclosed in Patent Document 1, sometimes, an inside diameter of the second branch flow path cannot be set at an appropriate value. Thus, the support stiffness of the hydrodynamic bearing is low.

PRIOR ART DOCUMENT

Patent Document
Patent Document 1: JP-A-2004-141982

DISCLOSURE OF THE INVENTION

One or more embodiments of the present invention provide a boring apparatus enabled to sufficiently enhance a support stiffness of a hydrodynamic bearing.

In accordance with one or more embodiments of the invention, a boring apparatus 1 is provided with: a base 20 on which a workpiece W having a through-hole 11 is placed; a cutting tool 30 to be inserted through the through-hole 11 of the workpiece W; a rotary drive device 40 configured to rotate the cutting tool 30; and a support jig 50A, 50B configured to support the cutting tool 30 by a bushing face 51. The cutting tool 30 is provided with: a tool body 31 having a main flow path 61 extending along a length direction Z of the tool body 31, and a branch flow path 63 extending from the main flow path 61 to an outer circumferential surface 312 of the tool body 31; a cutting blade 32 provided on the outer circumferential surface 312 of the tool body 31; a concave pocket 313 formed on the outer circumferential surface 312 of the cutting tool 31, at a part which faces the bushing face 51 of the support jig 50A, 50B and to which the branch flow path 63 is opened, over an area that is larger than an opening area of the branch flow path 63; a binding member 64 detachably mounted in the branch flow path 63; and an orifice 641 formed in the binding member 64 to communicate an upstream side of the branch flow path 63 with a downstream side of the branch flow path 63. A hydrodynamic bearing is formed between the cutting tool 30 and the support jig 50A, 50B by supplying a fluid to the main flow path 61 so as to supply the fluid between the outer circumferential surface 312 of the cutting tool 30 and the bushing surface 51 of the support jig 50A, 50B through the main flow path 61 and the branch flow path 63.

In the apparatus of the one or more embodiments, a workpiece is placed on the base. Then, the cutting tool is inserted through the through-hole of the workpiece. Next, the base end side of the cutting tool is connected to the rotary drive device. In addition, this cutting tool is supported by the support jig. Subsequently, this cutting tool is rotated while the fluid is supplied to the main flow path of the cutting tool. Then, the workpiece is bored by the cutting blade of the cutting tool.

Incidentally, the concave pocket is provided in the outer circumferential surface of the cutting tool. Thus, the fluid supplied to the main flow path of the cutting tool flows into the pocket through the branch flow path and the orifice and is stored in the pocket. Subsequently, the stored fluid flows out from between the outer circumferential surface of the cutting tool and the bushing surface of the support jig. Consequently, a hydrodynamic bearing is formed between the cutting tool and the support jig.

Thus, the fluid is stored in the pocket. Accordingly, the support stiffness thereof between the outer circumferential surface of the cutting tool and the bushing face of the support jig can be enhanced.

Further, the binding member provided with the orifice is adapted to be detachable from the branch flow path. Thus, a plurality of binding members may be prepared, which differ from one another in the shape of the orifice. Then, the plurality of binding members may be mounted in the branch flow path of the cutting tool by sequentially replacing the binding member. Thus, one of the binding members, which corresponds to the highest support stiffness of the hydrodynamic bearing, is picked out. This binding member can be mounted in the branch flow path. Accordingly, the orifice can easily be set to have an optimal shape. Consequently, the support stiffness of the hydrodynamic bearing can sufficiently be enhanced. The workpiece can be machined with high precision.

In this case, a plurality of binding members may be prepared so that the plurality of binding members differ from one another in the shape of the orifice. The plurality of binding members may be mounted in the branch flow path of the cutting tool by sequentially replacing the binding member. Then, a pressure of the fluid before passing through the orifice, and a pressure of the fluid after passing through the orifice may be measured. One of the plurality of binding members may be selected from the plurality of groups of binding members by picking out one of binding members having a ratio between the pressure of the fluid before passing the orifice and the pressure of the fluid after passing through the orifice, which is closest to a predetermined ratio value.

It has turned out that the support stiffness of the hydrodynamic bearing is increased as the ratio between the pressure of the fluid before passing through each of the orifices and the pressure of the fluid after passing through each of the orifices, becomes closer to a predetermined ratio value.

Thus, according to the one or more embodiments, one of binding members to be mounted in the branch flow path may be selected by the following procedure from the plurality of binding members. That is, first, a plurality of binding members that differ from one another in the shape of the orifice may be prepared. The plurality of binding members may be mounted in the branch flow path of the cutting tool by sequentially replacing the binding member. A ratio between the pressure of the fluid before passing through the orifice and the pressure of the fluid after passing through the orifice may be measured for each of the binding members mounted therein. Thus, one of binding members corresponding to the ratio between the pressure of the fluid before passing through the orifice and the pressure of the fluid after passing through the orifice, which is closest to the predetermined ratio value, may be picked out. Consequently, since the binding member largest in support stiffness can be mounted in the branch flow path, the support stiffness can be sufficiently be enhanced and the workpiece can be machined with high precision.

The length in an axial direction of the bushing surface of the support jig may be longer than that in the axial direction of the pocket.

In a case where the length in the axial direction of the bushing face of the support jig is shorter than that in the axial direction of the pocket, there are fears that each pocket would protrude from the bushing face, and that the hydrodynamic bearing cannot sufficiently surely be formed. However, according to the one or more embodiment, if the length in the axial direction of the bushing face of the support jig is set to be longer than that in the axial direction of the pocket, the pocket is prevented from protruding from an associated one of the bushing face. Consequently, the hydrodynamic bearing can surely be formed. A workpiece can be machined with higher precision.

Moreover, according to one or more embodiments of the present invention, a boring method for boring a workpiece W by a boring apparatus 1, in which the boring apparatus 1 is provided with a base 20 on which a workpiece W having a through-hole 11 is placed, a cutting tool 30 to be inserted through the through-hole 11 of the workpiece W, a rotary drive device 40 configured to rotate the cutting tool 30, and a support jig 50A, 50B configured to support the cutting tool 30 by a bushing face 51, and the cutting tool 30 is provided with a tool body 31 having a main flow path 61 extending along a length direction Z of the tool body 30 and a branch flow path 63 extending from the main flow path 61 to an outer circumferential surface 312 of the tool body 31, and a cutting blade 32 provided on the outer circumferential surface 312 of the tool body 31, the boring method is provided with the steps of: forming a concave pocket 313 on the outer circumferential surface 312 of the cutting tool 30, at a part which faces the bushing face 51 of the support jig 50A, 50B and to which the branch flow path 63 is opened, over an area that is larger than an opening area of the branch flow path 63; forming the branch flow path 63 such that a binding member 64 having an orifice 641 that communicates an upstream side of the branch flow path 63 with a downstream side of the branch flow path 63 is detachably mounted in the branch flow path 63; preparing a plurality of binding members 64 which differ from one another in diameter of the orifice 641; mounting the plurality of the binding members 64 in the branch flow path 63 by sequentially replacing the binding members 64; measuring a pressure of the fluid before passing through the orifice, and a pressure of the fluid after passing through the orifice; selecting one of the plurality of the binding members 64, which has a ratio between the pressure of the fluid before passing through the orifice and the pressure of the fluid after passing through the orifice, which is closest to a predetermined ratio value, and mounting the selected binding member in the branch flow path; and supplying a fluid to the main flow path 61 of the cutting tool 30 thereby supplying the fluid between the outer circumferential surface 312 of the cutting tool 30 and the bushing face 51 of the support jig 50A, 50B through the main flow path 61 and the branch flow path 63, and rotating the cutting tool 30 while a hydrodynamic bearing is formed between the cutting tool 30 and the support jig 50A, 50B, so as to bore the workpiece W.

According to the one or more embodiments of the present invention, the binding member having an orifice is configured to be detachable from and attachable to the branch flow path. Thus, a plurality of binding members differing from one another in the shape of the orifice may be prepared. Then, the plurality of binding members may be mounted in the branch flow path of the cutting tool by sequentially replacing the binding members. Subsequently, one of binding members maximizing the support stiffness of the hydrodynamic bearing can be picked out and mounted in the branch flow paths. Accordingly, the orifices can easily be set to have an optimal shape. Consequently, the support stiffness of the hydrodynamic bearing can sufficiently be enhanced. The workpiece can be machined with high precision.

Other aspects and advantages of the invention will be apparent from the following description, the drawings and the claims.

DESCRIPTION OF AN EMBODIMENT OF THE INVENTION

An exemplary embodiment of the invention is described with reference to the accompanying drawings.

Figure 1:
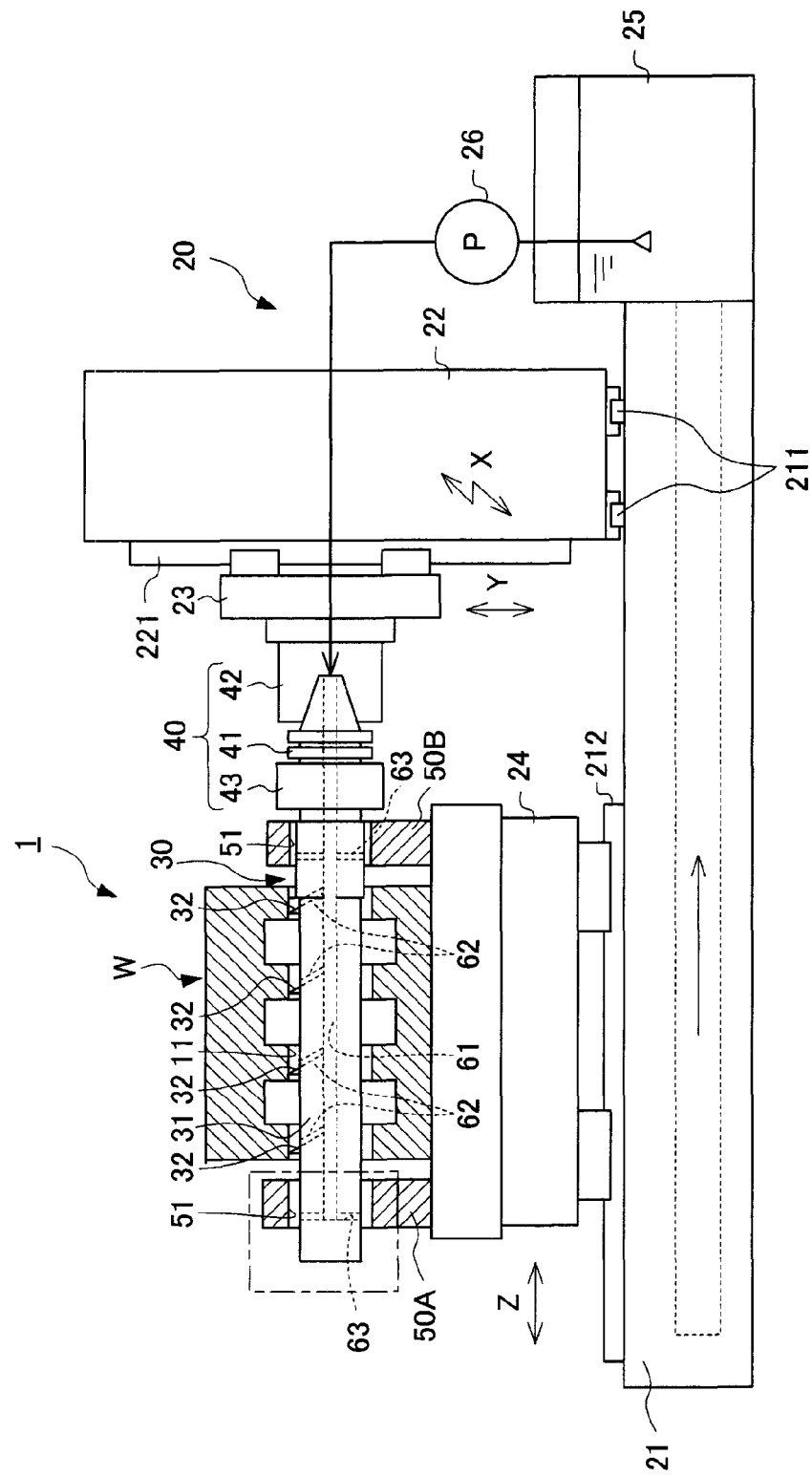
FIG. 1 is a side view illustrating a schematic configuration of a boring apparatus according to an embodiment of the invention.

FIG. 1 is a side view illustrating a schematic configuration of a boring apparatus 1 according to the exemplary embodiment of the invention.

The boring apparatus 1 includes a base 20 on which a workpiece W provided with a through-hole 11 formed therein is placed, a cutting tool 30 to be inserted through the through-hole 11 of the workpiece W, a rotary drive device 40 that supports a base end side of the cutting tool 30 and rotates the cutting tool 30, and support jigs 50A and 50B that support a distal end side and the base end side of the cutting tool 30, respectively.

The base 20 includes a flat-plate-like bed 21, a first slide portion 22 that is movable in the direction of X-axis (i.e., in a depth direction in FIG. 1) along a guide rail 211 on the bed 21, a second slid portion 23 that is movable in the direction of Y-axis (i.e., in an up-down direction in FIG. 1) along a guide rail 221 on the first slide portion 22, and a table 24 that is movable in the direction of Z-axis (i.e., in a lateral direction in FIG. 1) along the guide rail 212 on the bed 21.

Further, the bed 21 is provided with a tank 25 that accommodates machining liquid serving as a fluid. The tank 25 is provided with a pump 26 that sends out the machining liquid.

The rotary drive device 40 is provided in the second slide portion 23 and includes a rotating shaft 41, to which the cutting tool 30 is connected via a joint 43, and a drive portion 42 that rotates the rotating shaft 41.

The workpiece W is placed on the table 24 of the base 20.

The support jigs 50A and 50B are provided on both end sides of the table 24 of the base 20, respectively. Further, each of the support jigs 50A and 50B supports an associated one of the distal end side and the base end side of the cutting tool 30 by a bushing face 51 thereof.

The cutting tool 30 includes a cylindrical tool body 31, and cutting blades 32 provided on the outer circumferential surface of the tool body 31.

Figure 2:
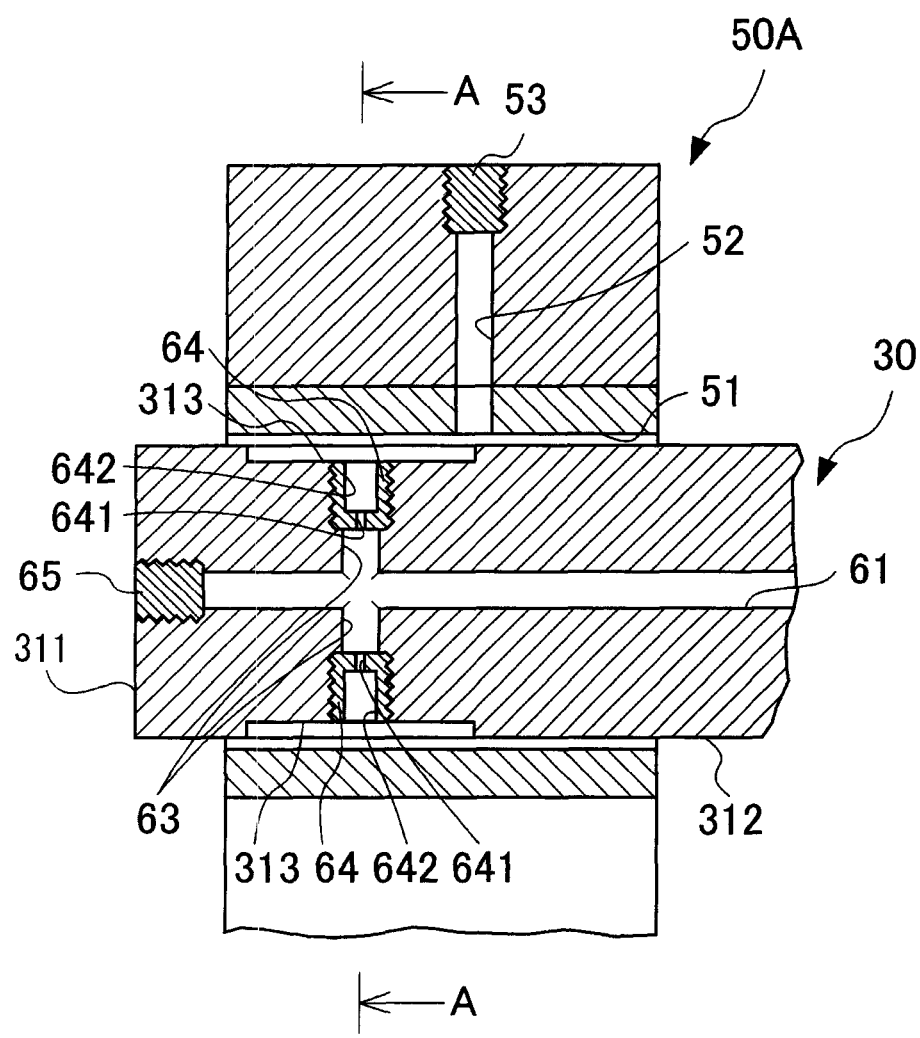
FIG. 2 is a partially enlarged view illustrating a cutting tool and a support jig of the boring apparatus according to the embodiment.
Figure 3:
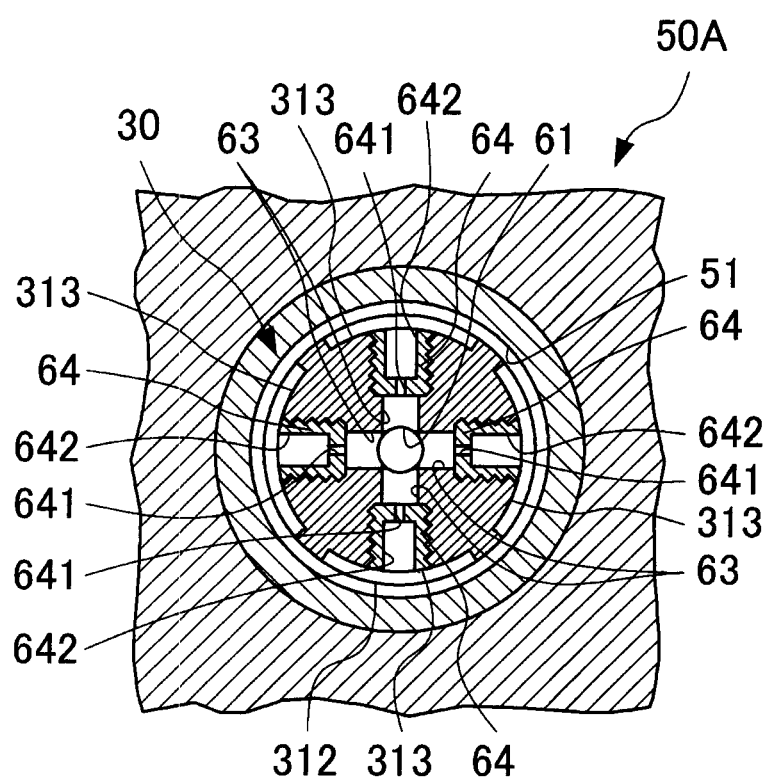
FIG. 3 is a cross-sectional view taken on line A-A shown in FIG. 2.

FIG. 2 is a partially enlarged cross-sectional view illustrating the cutting tool 30 and the support jig 50A. FIG. 3 is a cross-sectional view taken on line A-A illustrated in FIG. 2.

Hereinafter, the support jig 50A is described. However, the support jig 50B has a configuration similar to the configuration of the support jig 50A, In the tool body 31, the following flow paths 61, 62, and 63 are formed. That is, a main flow path 61 extends in a length direction thereof and reaches an end surface 311. First branch flow paths 62 (see FIG. 1) extend from partway-positions of the main flow path 61, respectively, and reach the outer circumferential surface 312. Each of second branch flow paths 63 serves as a branch flow path that is provided in an associated one of a distal-end-side portion and a base-end-side portion of the main flow path 61 and that reaches the outer circumferential surface 312.

Machining liquid is supplied from the tank 25 to the main flow path 61 by driving the pump 26 (see FIG. 1).

An insert plug 65 is screwed into an end of the main flow path 61. The main flow path 61 is blocked up by this insert plug.

Each of the first branch flow paths 62 extends from an associated partway-position of the main flow path 61 and reaches the vicinity of an associated one of the cutting blades 32 (see FIG. 1).

Four of the second branch flow paths 63 are provided in each of the support jigs 50A and 50B and extend radially in radial directions.

In each of these second branch flow paths 63, a setscrew 64 serving as a binding member is detachably mounted.

The setscrew 64 constitutes a communicating path that communicates an upstream side of each second branch flow path 63 with a downstream side thereof. This communicating path is formed as an orifice 641. That is, the orifice 641 is provided in a commercially available setscrew in which a hexagon socket 642 is formed.

A part of the outer circumferential surface 312 of the cutting tool 30 faces the bushing face 51 of the support jig 50A and is formed such that the second branch flow paths 63 are opened therein. A concave pocket 313 is formed in this part over an area larger than the opening area of the second branch flow path 63.

The length in an axial direction of the pocket 313 is shorter than that in an axial direction of an associated one of the busing faces 51 of the support jig 50A.

In the support jig 50A, a flow path 52 extending from the bushing face 51 to an exterior is formed. An insert plug 53 is screwed into this flow path 52. The flow path 52 is blocked up by this insert plug.

Meanwhile, the setscrew 64 to be mounted in each second branch flow path 63 is selected from a plurality of setscrews 64 of groups that differ from one another in the inside diameter of the orifice 641. Hereinafter, a procedure for selecting one of the groups of the setscrew 64 is described.

First, a plurality of setscrews 64 of the groups that differ from one another in the inside diameter of the orifice 641 are prepared.

Next, the plurality of setscrews 64 of each group are mounted in the second branch flow paths 63 of the cutting tool 30 by sequentially replacing the groups of the setscrews 64 in units of groups. Then, the machining liquid is supplied to the second branch flow paths 63. Further, a pressure of the machining liquid before passing through each orifice 641, and a pressure of the machining liquid after passing through each orifice 641 are measured.

More specifically, the insert plug 65 is removed from the main flow path 61. Then, a pressure gauge is mounted in the main flow path 61. A measured value obtained by this pressure gauge is employed as the value of the pressure of the machining liquid before passing through each orifice 641. Further, the insert plug 53 of the flow path 52 is removed. Then, a pressure gauge is mounted in the flow path 52. A measure value of this pressure gauge is employed as the pressure of the machining liquid after passing through each orifice 641.

Next, the setscrews 64 of the group having a ratio of the pressure of the machining liquid before passing through the orifice 641 to that of the machining liquid after passing the orifice 641, which is closest to a predetermined ratio value, are picked out and actually used. Incidentally, this predetermined ratio value is 0.59, for example.

An operation of the aforementioned boring apparatus is described below.

First, the workpiece W is placed on the table 24 of the base 20. Then, the cutting tool 30 is inserted through the through-hole 11.

Next, the base end side of the cutting tool 30 is connected to the rotating shaft 41 of the rotary drive device 40. The distal end side and the base end side of the cutting tool 30 are supported by the support jigs 50A and 50B, respectively.

Subsequently, the pup 26 is driven. Thus, the cutting tool 30 is rotated while the machining liquid is supplied to the main flow path 61 of the cutting tool 30. Then, while this machining liquid is sprayed onto the inner circumferential surface of the through-hole 11 in the workpiece W, the cutting tool 30 rotates. The workpiece W is bored by the cutting blades 32 of the cutting tool 30. Incidentally, heat and chips generated in a machined part of the workpiece are removed by the sprayed machining liquid. In addition, the lubricating ability between the machined part and the cutting blade can be enhanced.

On the other hand, the machining liquid supplied to the main flow path 61 of the cutting tool 30 flows into the pocket 313 through the second branch flow paths 63 and the orifices 641. After stored in the pocket 313, the machining liquid flows out for between the outer circumferential surface 312 of the cutting tool 30 and the bushing face 51 of each of the support jigs 50A and 50B. Consequently, a hydrodynamic bearing is formed between the cutting tool 30 and each of the support jigs 50A and 50B.

The present exemplary embodiment has the following advantages.

(1) The machining liquid is stored in each pocket 313. Thus, the support stiffness of the hydrodynamic bearing between the outer circumferential surface 312 of the cutting tool 30 and the bushing surface 51 of each of the support jigs 50A and 50B can be enhanced.

In addition, the setscrews 64 provided with the orifice 641 are formed detachably from the second branch flow path 63. Further, the setscrews 64 of the groups that differ from one another in the inside diameter of each orifice 641 are prepared. The plural setscrews 64 of each group are mounted in the second branch flow path 63 of the cutting tool 30 by sequentially replacing the groups of the setscrews 64 in units of groups. Then, the pressure of the machining liquid before passing through each of the orifices, and that of the machining liquid after passing each of the orifices are measured. The setscrews 64 of the group having a ratio of the pressure of the machining liquid before passing through the orifice to that of the machining liquid after passing the orifice, which is closest to a predetermined ratio value, are actually mounted in the second branch flow path 63. Accordingly, the orifices 641 can easily be designed to have an optimal shape. Consequently, the support stiffness of the hydrodynamic bearing can sufficiently be enhanced. The workpiece W can be machined with high precision.

(2) The length in the axial direction of the pushing face 51 of each of the support jigs 50A and 50B is set to be longer than the length in the axial direction of an associated one of the pockets 313. Thus, each pocket 313 can be prevented from protruding from an associated one of the bushing faces 51. Consequently, a hydrodynamic bearing can surely be formed. The workpiece W can be machined with higher precision.

While description has been made in connection with the specific exemplary embodiment of the invention, it will be obvious to those skilled in the art that various changes and modification may be made therein without departing from the present invention. It is aimed, therefore, to cover in the appended claims all such changes and modifications falling within the true spirit and scope of the present invention.

Industrial Applicability:

The present invention is applicable for a boring apparatus and a boring method for boring a workpiece having a through-hole.

Description Of Reference Numerals And Signs

W workpiece
1 boring apparatus
11 through-hole
20 base
30 cutting tool
31 tool body
32 cutting blade
40 rotary drive device
50A, 50B support jigs
51 bushing face
61 main flow path
63 second branch flow path
64 setscrew (binding member)
312 outer circumferential surface
313 pocket
641 orifice
642 hexagonal hole (part of an orifice)

The invention claimed is:

1. A boring method for boring a workpiece by a boring apparatus, the boring apparatus comprising a base on which a workpiece having a through-hole is placed, a cutting tool to be inserted through the through-hole of the workpiece, a rotary drive device configured to rotate the cutting tool, and a support jig configured to support the cutting tool by a bushing face, the cutting tool including a tool body having a main flow path extending along a length direction of the tool body and a branch flow path extending from the main flow path to an outer circumferential surface of the tool body, and a cutting blade provided on the outer circumferential surface of the tool body, the boring method comprising:

forming a concave pocket on the outer circumferential surface of the cutting tool, at a part which faces the bushing face of the support jig and to which the branch flow path is opened, over an area that is larger than an opening area of the branch flow path;

forming the branch flow path such that a binding member having an orifice that communicates an upstream side of the branch flow path with a downstream side of the branch flow path is detachably mounted in the branch flow path;

preparing a plurality of binding members which differ from one another in diameter of the orifice;

mounting the plurality of the binding members in the branch flow path by sequentially replacing the binding members;

measuring a pressure of the fluid before passing through the orifice by removing a first insert plug that has been blocking the main flow path at an end of the main flow path and by attaching a pressure gauge to the main flow path, and measuring a pressure of the fluid after passing through the orifice by removing a second insert plug that has been blocking a support jig flow path formed in the support jig from the busing face to an exterior and by attaching a pressure gauge to the support jig flow path;

selecting one of the plurality of the binding members, which has a ratio between the pressure of the fluid before passing through the orifice and the pressure of the fluid after passing through the orifice, which is closest to a predetermined ratio value, and mounting the selected binding member in the branch flow path; and supplying a fluid to the main flow path of the cutting tool thereby supplying the fluid between the outer circumferential surface of the cutting tool and the bushing face of the support jig through the main flow path and the branch flow path, and rotating the cutting tool while a hydrodynamic bearing is formed between the cutting tool and the support jig, so as to bore the workpiece.

\* \* \* \* \*